April 27, 1943.    W. G. CHAUSSE    2,317,441
HEATING APPARATUS
Filed Feb. 7, 1941    3 Sheets-Sheet 1

Inventor
Wilfred G. Chausse
By
Attorneys

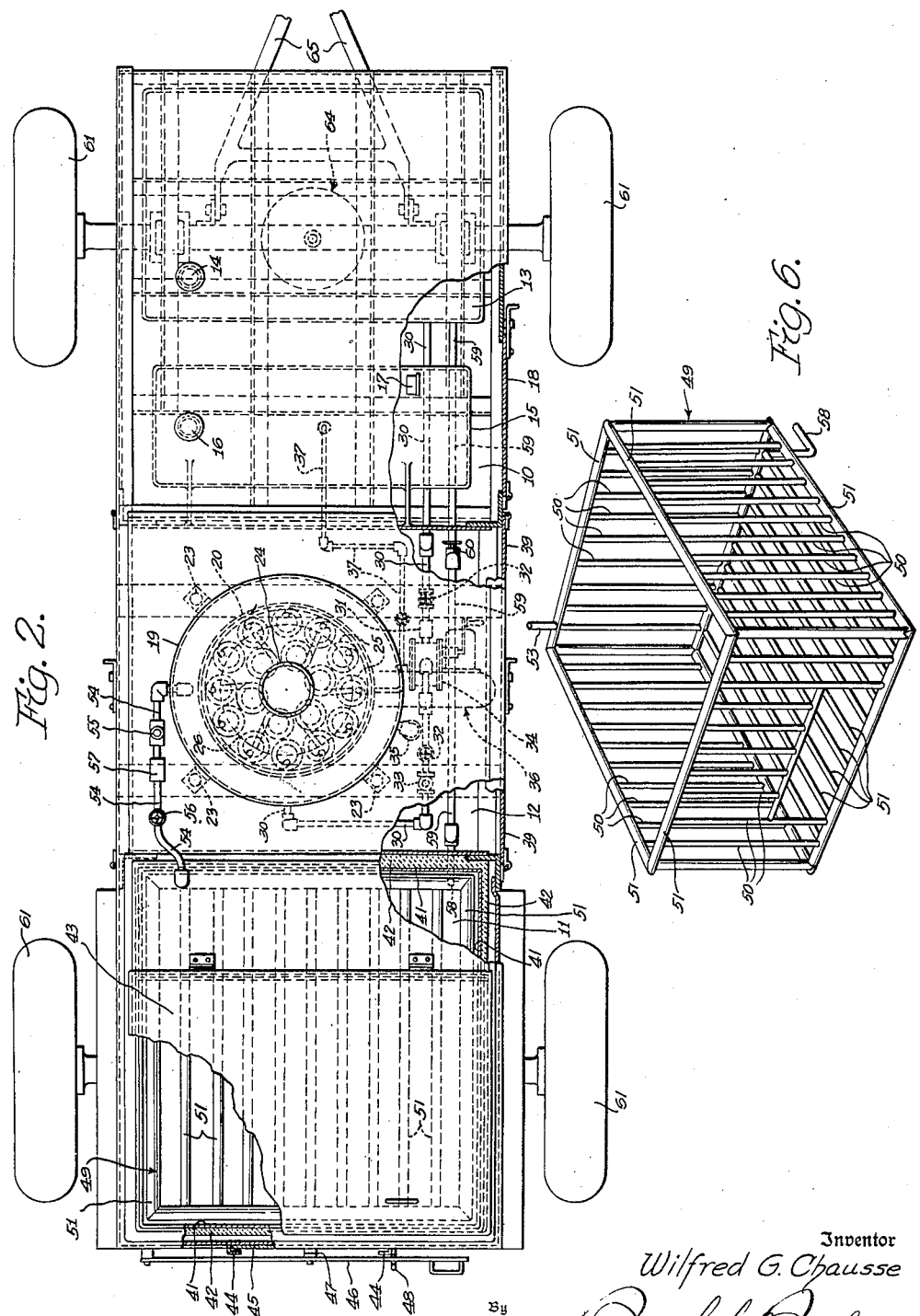

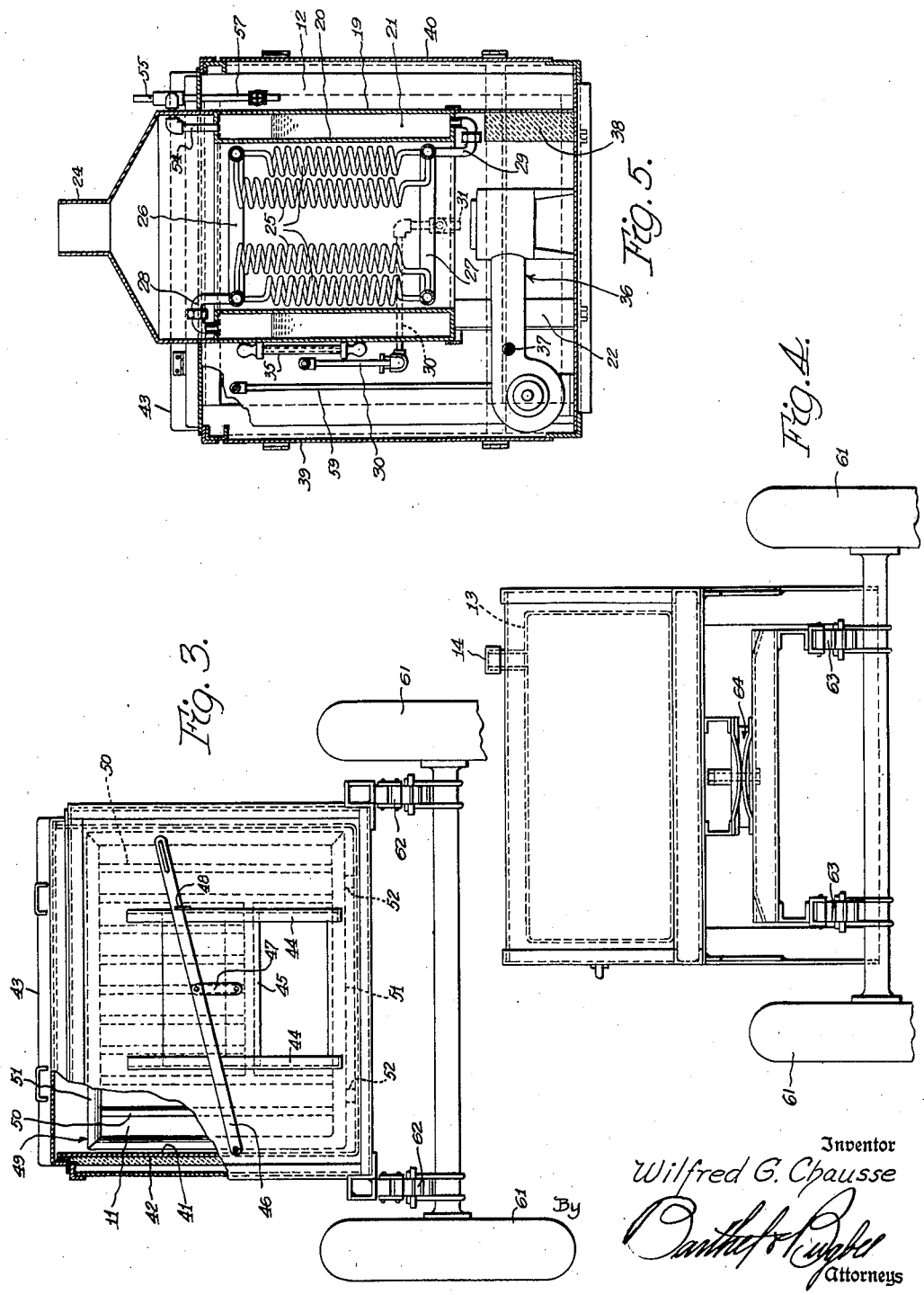

Patented Apr. 27, 1943

2,317,441

UNITED STATES PATENT OFFICE 2,317,441

HEATING APPARATUS

Wilfred G. Chausse, Detroit, Mich.

Application February 7, 1941, Serial No. 377,875

1 Claim. (Cl. 257—248)

This invention relates, in general, to heating apparatus and, in particular, to apparatus of the portable or mobile type.

One of the objects of the present invention is to provide a new and improved apparatus which is transportable from place to place and affords a compact and efficiently operable heating plant for material in transit.

Another object is to provide a new and improved apparatus in which material such as asphalt may be efficiently heat treated and transported.

Another object is to provide a new and improved apparatus which is particularly adaptable for heating and transporting material such as asphalt, and the parts or elements of which apparatus are easily and inexpensively constructed and novelly arranged into a compact, rigid unit having an extremely high operating efficiency.

Other objects and advantages of the invention will become readily apparent from a reference to the following specification taken in conjunction with the accompanying drawings of which there are three (3) sheets and wherein:

Figures 1 and 2 are side and top views, respectively, of the vehicle, each being partly broken away and in section to illustrate more clearly some of the details of the apparatus embodied in said vehicle;

Figs. 3 and 4 are views looking at the rear and front ends, respectively, of the vehicle, the former being partly broken away and in section also for illustrative purposes;

Fig. 5 is a transverse section taken along the lines 5—5 in Fig. 1; and

Fig. 6 is a perspective view of the heater element.

Figure 1:
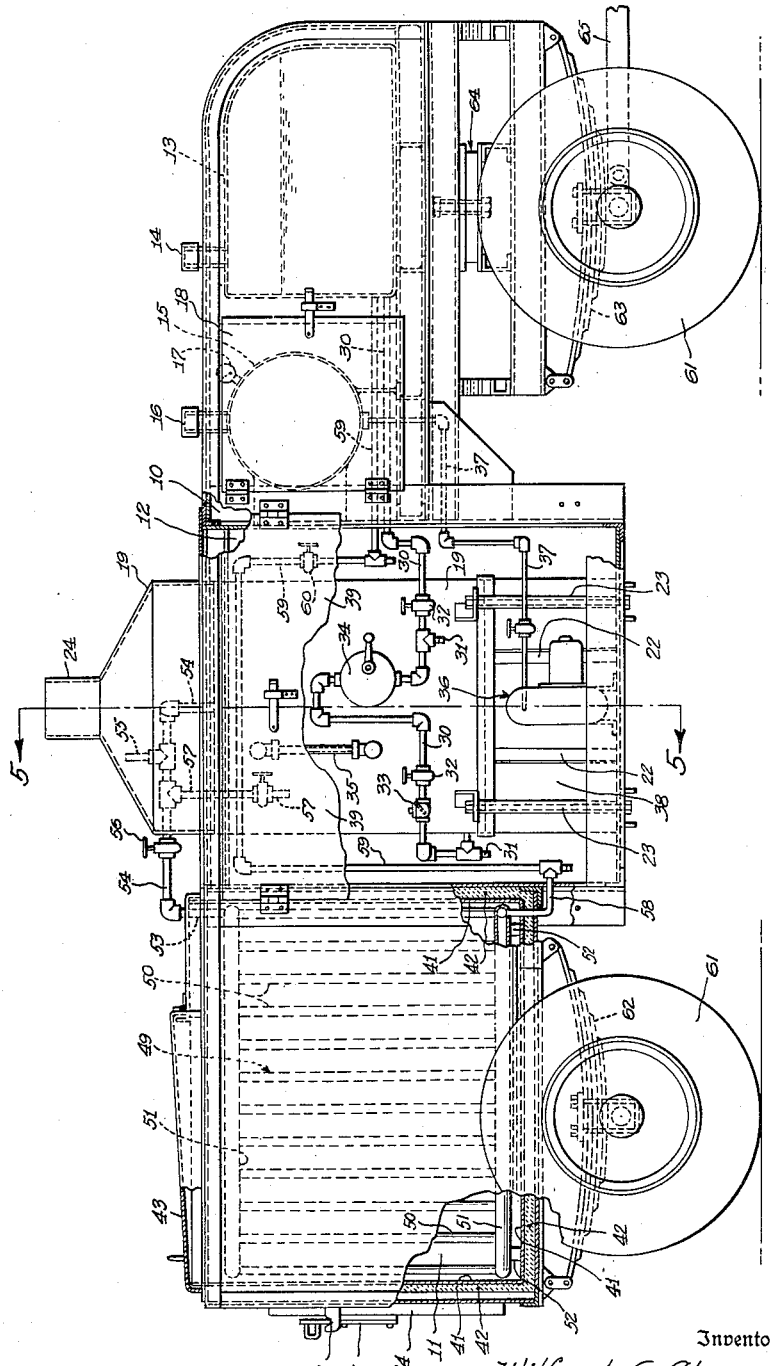

The apparatus herewithin disclosed, described and claimed is preferably of sheet metal construction throughout, having its walls interjoined by means of welding and reenforced by means of members of desired and appropriate cross-section. When assembled, the apparatus provides a sturdy structure, dimensioned within the legal limits established for highway travel and capable of said travel. In assembly, the apparatus affords, what will hereinafter be termed, a reservoir compartment 10 at its front end, a storage compartment 11 at its rear end and a heat generating compartment 12 therebetween, all of these compartments being closed and separate from each other, yet inter-supported and comprising integral parts of the whole for performing their particular functions toward attainment of the common end. For instance, reservoir compartment 10 serves as the housing for the reserves of fuel and water necessary for the heat and steam required; storage compartment 11 serves as the means for storing the material to be transported and for housing the means for heating said material during transit; and, heat generating compartment 12 serves as the housing for the main heating and steam plants.

The front portion of reservoir compartment 10 is substantially fully occupied by a water supply tank 13 having a main inlet 14 which extends through a wall of said compartment and provides means whereby said tank may be charged, and the rear portion of said compartment is occupied by a fluid fuel supply tank 15 having an inlet 16 which likewise extends through said wall for charging purposes. Due to the proposed mobility of the apparatus, tanks 13 and 15 are secured or anchored in any well known manner to the walls of compartment 10 so as to be immovable relatively to said apparatus. Tank 15, as is usual, is equipped with a gauge 17 of standard construction, and, so that said gauge (as well as the other equipment within compartment 10) may be inspected, repaired or otherwise dealt with, one of the walls of said compartment is formed with an opening over which is hingedly carried a lockable door 18.

Heat generating compartment 12, which is behind reservoir compartment 10, houses a pair of cylindrical shells 19 and 20 which are arranged concentrically and interconnected so as to provide an annular, sealed fluid chamber or jacket 21 therebetween. Unit 19—20—21 is vertically supported in substantially the center of compartment 12 well above the bottom wall of said compartment by means of supports 22 and held in place by means of anchors 23, outer shell 19 of said unit extending upwardly beyond jacket 21 of said unit through the top wall of said compartment and being formed at its upper end externally of said compartment with a stack 24. Vertically disposed within the space defined by the inner shell 20 of unit 19—20—21 is a plurality of fluid coils 25 in communication with each other at their upper ends by means of a common header connection 26 and in communication with each other at their lower ends by means of another common header connection 27. Unit 25—26—27 is communicated at its upper end with the upper end of jacket 21 of unit 19—20—21 by means of an interconnecting conduit 28 and at its lower end with the lower end of said jacket by means of another and interconnecting conduit 29.

Jacket 21 is provided near its lower end with a fluid inlet to which is connected one end of a fluid conduit 30, said conduit extending from said inlet and having its opposite end, after passing through the wall separating compartments 10 and 12, connected to a fluid outlet provided in the lower end of tank 13. In this manner it can be seen that the water tank 13, jacket 21 and coils 25 are all intercommunicated, and, wherever necessary and/or desired, manually operable drains 31 and valves 32 and a check valve 33 may be inserted in the conduit 30 which makes possible such intercommunication. Furthermore, if it is desired, a manually operable pump 34 may be inserted in conduit 30 for assuring water travel from tank 13 to jacket 21 and coils 25, and a level gauge 35 may also be provided for indicating the water level in said jacket.

Carried on the bottom wall of compartment 12 is a fluid fuel burning unit, generally indicated at 36, of any desired and well known construction, the burner of said unit being disposed directly below and centrally of the group of coils 25 and the fuel inlet of said unit being connected to one end of a valved conduit 37 the opposite end of which is connected to an outlet provided in fuel tank 15. Operation of unit 36 by proper control of fuel thereto is capable of transforming, by heat interchange, the fluid in jacket 21 and coils 25 from liquid state to vapor state, and the disposition of the resulting vapor will soon be discussed. If desired, the burner portion of unit 36 may be surrounded, as shown in Fig. 5, by material such as fire brick 38 for heat refractory purposes, the wall formed thereby preferably being provided with a side opening (see Fig. 1) between two of the supports 22 which are employed for supporting unit 19—20—21—25, so that the blower portion of said unit may be received and the entire unit made accessible when desired. Furthermore, so that the interior of compartment 12 may in its entirety be made accessible, the two opposite side walls forming said compartment may be comprised of hinged, lockable double doors 39 and 40.

Storage compartment 11, which is behind heat generating compartment 12, is preferably provided with an inner lining 41 carried by and extending along at least the front, bottom, rear and two side walls of said compartment, said lining being spaced from said walls so that heat insulating material 42 may be positioned therebetween. The upper wall of compartment 11 is provided with an opening which is closable by a door 43 hinged to said wall along a side of said opening, and this opening serves as the means through which said compartment may be loaded with the material which is to be transported and simultaneously heated. The rear wall of compartment 11, together with the rear sections of lining 41 and insulation 42, are provided with aligned openings through which the above mentioned material may be removed from said compartment. The rear wall of compartment 11 has secured thereto a pair of channels 44, vertically arranged in laterally spaced relationship to each other and cooperating to support a door 45 which is slidable therealong for covering or exposing the aforementioned opening in said wall. The actuator for door 45 may comprise an elongated bar 46 which is pivotally supported at one end to the rear wall of compartment 11 laterally of the opening therein and pivotally connected at a point intermediate its ends to the upper end of a link 47, the lower end of said link being pivotally connected to a substantially central portion of said door, and the opposite end of said bar serving as a handle and being selectively cooperable with a keeper 48 secured to said wall for supporting said door, at will, in an elevated position at which said opening is exposed.

Operable for arrangement within compartment 11 in order that the material stored therewithin may be heated is a heater device, generally indicated at 49, comprising a plurality of vertically disposed tubular members 50 connected to for fluid communication with a plurality of horizontally disposed tubular members 51. Device 49 is an open-work, box-like structure defining a space having a cubical content not much less than that defined by the inner lining 41 of compartment 11, so that the tubes 50 and 51 comprising said device may have a very slight spacing from said lining. The top of device 49 is preferably void of tubes so that the loading of compartment 11 may not be interfered with, and the side of said device which corresponds to the rear wall of said compartment has that portion which aligns itself with the opening in said wall also void of tubing so as not to interfere with the removal of the material from said compartment. The spacing between the botom lining of compartment 11 and the bottom of device 49 may be effectuated by means of upraised portions 52 formed either on said lining or on said device bottom, as shown in Fig. 1.

One of the upper horizontal tubes 51 of device 49 is formed with a fluid inlet 53 to which is connected one end of a fluid conduit 54 the opposite end of which conduit is connected into the upper end of jacket 21 so as to intercommunicate said device and the vapor-containing portion of said jacket for heat interchange. Conduit 54, between jacket 21 and device 49, is provided as is customary with the usual relief valve 55 and may also be provided with a standard, manually operable valve 56 for controlling the steam flow from said jacket into said device; said conduit, furthermore, may be provided with a valved branch conduit 57 which may be called upon at will to provide a source of steam supply for use externally of said device.

One of the lower horizontal tubes 51 of device 49 is formed with a fluid outlet 58 to which is connected one end of a fluid conduit 59 the opposite end of which conduit is connected into the lower end of water supply tank 13 so as to intercommunicate said tank and the condensate-containing portion of said device. Conduit 59 may be provided with a standard flow control valve 60 and it may also be provided with drain valves wherever necessary or desired.

It is intended that the vehicle be mobile so that the material, such as asphalt, which is to be heated by the steam in the heater device 49 may also be transported to its destination while being so heated. For this reason, the vehicle is supported at its front and rear by road wheels 61, the rear pair of said wheels having a spring set 62 resiliently interconnecting said vehicle and said last mentioned wheels in the ordinary manner, and the front pair of said wheels having a spring set 63 connected in the usual manner thereto and to a fifth wheel construction, generally indicated at 64, of any well known design which is supported in the usual manner by said vehicle for interconnecting said vehicle and said last mentioned wheels and permitting steering of the former by the latter. A tongue 65 of any desired design is connected in the usual manner to the front wheel carriage so that the vehicle may be towed and steered (by means of the fifth wheel construction 64).

Although the invention has been described with some detail it is not intended that such description is to be definitive of the limits of the inventive idea. The right is reserved to make such changes in the details of construction and arrangement of parts as will fall within the purview of the attached claim.

What I claim is:

In a heating apparatus, a lower header member having an inlet including rectangularly arranged tubular conduits with their ends connected to provide a fluid passageway, a series of spaced conduits connecting opposed tubular header members to allow circulation of fluid through the header and to form a floor portion, an upper header member having an outlet, said upper header including tubular conduits connected at their ends to provide a rectangular fluid passageway parallel with the lower header member, a series of vertical tubular conduits connecting the lower and upper headers on all four sides to space said headers and allow circulation of fluid flow therebetween, certain of said vertical conduits on one side being interrupted to provide a clean-out opening for removing foreign matter from between the conduits forming the floor portion, and a tubular conduit connecting the interrupted vertical conduits to allow fluid flow around said opening.

WILFRED G. CHAUSSE.